Nov. 26, 1935.  B. W. HANLE  2,022,416
CLIP
Filed Jan. 5, 1935
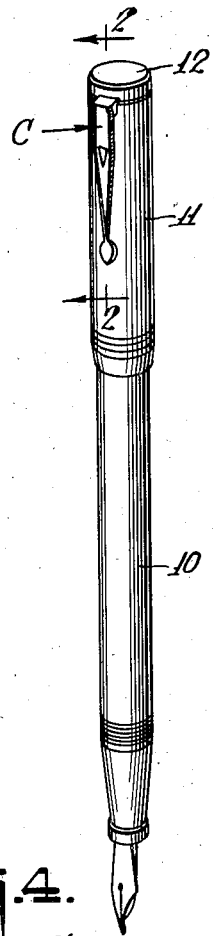
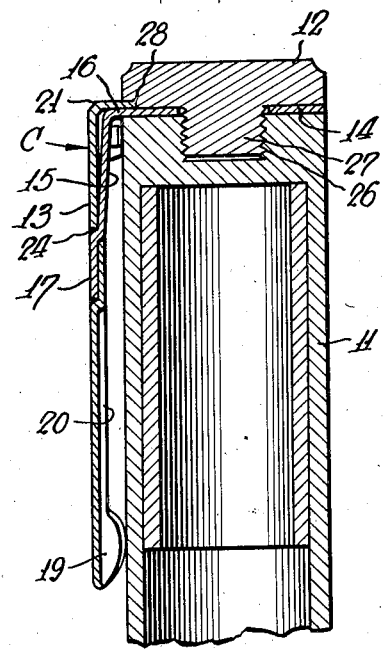
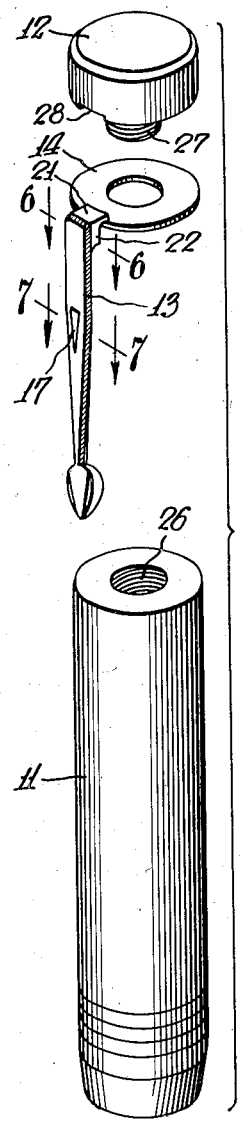
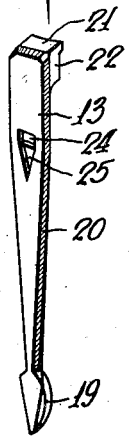
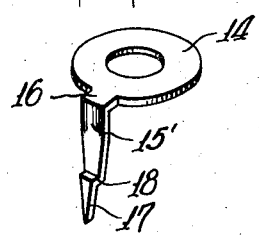
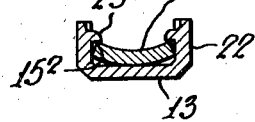
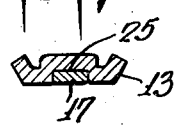
INVENTOR
Benjamin W. Hanle
BY
ATTORNEYS Patented Nov. 26, 1935

2,022,416

UNITED STATES PATENT OFFICE 2,022,416

CLIP

Benjamin W. Hanle, Elizabeth, N. J., assignor to Eagle Pencil Company, a corporation of Delaware Application January 5, 1935, Serial No. 463

12 Claims. (Cl. 24—11)

My present invention is concerned with pocket gripping clips as such, and in combination with fountain pens, pencils and other elongated instruments and instrument cases with which such clips are commonly used.

The invention is particularly concerned with a clip unit of the general type described in my prior Patents No. 1,622,316, issued March 29th, 1927, and No. 1,926,852 issued September 12th, 1933, and has for one object to avoid resort to rivet holes, fastener slots or other mutilation of the cap or case for the purpose of mounting the spring metal carrier of the clip proper.

Another object is to provide a device of the above type, readily made from a couple of simple metal stampings, easily assembled into a secure unit readily mounted on the cap or case and affording a particularly secure hold, not apt to become loose even under conditions of severe use.

Another object is to provide a device of the above type, which lends itself readily to execution in any of a wide variety of ornamental effects.

In the accompanying drawing, in which is shown one of various possible embodiments of the several features of the invention, Fig. 1 is a perspective view of a fountain pen, showing my clip mounted on the cap, Fig. 2 is a transverse sectional view on a larger scale through a fragment of the cap, showing the clip installed, Fig. 3 is a dropped perspective view of the elements of the cap and clip prior to installation, Fig. 4 is a perspective view of the clip proper, Fig. 5 is a perspective view of the clip carrier, Fig. 6 is a detail transverse sectional view on line 6—6 of Fig. 3, and Fig. 7 is a view similar to Fig. 6 and on line 7—7 of Fig. 3.

Referring now to the drawing, the pen 10 is shown with a cap 11, provided with the clip unit C. The clip unit is made of two metal stampings including the clip proper and a tempered spring metal carrier therefor. The carrier comprises a circular washer 14, from the outer periphery of which extends a shank 15, the root 16 of which is preferably in the plane of the washer, the shank 15 extending at right angles thereto. The upper part of said shank is concave or trough shaped at 15' and the lower part thereof plane and tapered as shown to a triangular tip 17, offset at 18.

The clip proper 13 is a stamping, preferably of gold, silver or other metal, appropriately alloyed for wear, which stamping may be swaged at its extremity, if desired, into the pocket gripping knob 19 and may have bevelled edges 20 for a combined ornamental and stiffening effect. The upper end of the clip proper has a heel 21 bent over at right angles and formed unitary with lateral ears 22 which also extend integrally from the sides of the clip to afford a stiff fastening conformation. The clip also has a sheath somewhat below the heel, said sheath comprising a triangular depression 25 bounded at its upper edge by a slot 24.

To affix the clip 13 to the carrier, the lower triangular extremity 17 of the carrier shank is preferably extended through the transverse slot 24 in the clip which constitutes the entrance to a sheath determined by the triangular depression 25. The offset 18 of the carrier shank fills slot 24 and the tip 17 fills depression 25 and comes flush with the face of the clip to create the effect of an inlay. Heel 21 is superposed over root 16 of the carrier shank, and the ears 22 are staked inward at lugs 23, which tend to flatten out the concavity of shank part 15' by resilient engagement with the edges $15^2$ of the carrier shank. The parts are thus securely assembled without any looseness between the two stampings.

The cap body, case or other element to which the clip is to be attached is preferably molded with a closed end which presents a threaded axial socket 26 for accommodating the correspondingly threaded stud 27 of an end plug, the head 12 of which, when in place, comes flush with the cap. The head 12 is preferably provided with a shallow notch 28 in its under face to accommodate and effect a key connection with respect to the heel piece 21 of the clip, which protrudes above the plane of the carrier washer 14. The clip and cap being thus keyed together, the stud 27 is readily threaded into the socket 26 and securely clamps the washer 14 in place. If desired, the parts may also be cemented together.

Where the clip carrier is secured to the cap or case by resort to rivet holes, or fastener slots, loosening of the clip and breakage of the cap or case almost invariably occurs in time at such mutilated region, since this is not only the weakest part of the cap or case, but has to stand the maximum strain in use.

By my clip, on the other hand, no rivet holes, fastener slots or other mutilation of the cap or body are required or resorted to, and since the clip is secured by frictional contact of the large area of washer 14 and by the keying of heel 21 to the plug head 12, which in turn is cemented to the body, the strain of the clip in use is applied at regions that are intact and where there is adequate strength to resist it. Nor is there likelihood of loosening between the clip and its carrier, for the reasons above set forth.

It will thus be seen that there is herein described an article in which the several features of this invention are embodied, and which article in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:

1. A fountain pen cap or the like, comprising a cap body, a washer of spring metal, and a shank extending integrally from the periphery thereof and at right angles thereto, a clip interlocked with said shank and substantially covering the latter, and at its upper end overlapping a part of the outer periphery of said washer, a threaded plug for the end of said cap body, having a notch accommodating the overlapping part of said clip, said plug having a stud threaded into the upper extremity of said body and clamping said washer against said body.

2. A clip attachment unit for fountain pens or the like, comprising a spring metal clip carrier including a cap anchoring portion, a shank integral therewith at right angles thereto and a clip member on said carrier, secured at its upper end to said carrier, and an interlocking connection between the lower extremity of said shank and said clip member.

3. A clip attachment unit for fountain pens or the like, comprising a spring metal clip carrier including a cap anchoring portion, a shank integral therewith at right angles thereto and a clip member on said carrier, secured at its upper end to said carrier, and an interlocking connection between the lower extremity of said shank and said clip member.

4. A clip attachment unit for fountain pens or the like, comprising a spring metal clip carrier including a cap anchoring portion, a shank integral therewith at right angles thereto and a clip member on said carrier, secured at its upper end to said carrier, the lower part of said carrier shank extending through a transverse slit in the clip member.

5. A clip attachment unit for a fountain pen cap of the type including an end plug, said attachment comprising a spring metal clip holder including a washer and an integral shank extending at right angles from the outer periphery thereof, a clip member overlapping said shank and having integral ears, having parts overlapping the sides of said shank and clasping the contiguous part of said washer.

6. A clip attachment unit for a fountain pen cap of the type provided with an end plug, said unit including a clip carrier comprising a spring metal piece having a washer to encircle the stud of said plug, and to be clamped against the body by the head of said plug, said carrier also including a shank at right angles to the outer periphery of said washer, a heel piece integral with said clip overlapping the outer periphery of said washer, and ears integral therewith straddling the upper end of said shank and having lugs embracing said clip member, presenting a sheath accommodating the lower extremity of said shank.

7. A clip attachment unit for a fountain pen cap of the type provided with an end plug, said unit including a clip carrier comprising a spring metal piece having a washer to encircle the stud of said plug, and to be clamped against the body by the head of said plug, said carrier also including a shank extending at right angles from the outer periphery of said washer, a heel piece integral with said clip overlapping the outer periphery of said washer, and ears integral therewith straddling the upper end of said shank, and having parts overlapping the opposite edges thereof, said clip member presenting a sheath accommodating the lower extremity of said shank, said sheath comprising a depressed area in said clip, overlapped by the lower exposed extremity of said shank protruding through a transverse slit in said clip comprising the entrance to said sheath.

8. A clip attachment unit for a fountain pen cap or the like, comprising a clip proper of sheet metal, having a peripheral stiffening bevel, said clip member having a transverse slit and a triangular depressed area, bounded by said slit, said clip member having a unitary heel piece and lateral ears integral with the clip and with the heel thereof, for accommodating a clip carrier.

9. A clip attachment unit for a fountain pen cap or the like, comprising a clip proper of sheet metal, having a peripheral stiffening bevel, said clip having a transverse slit and a triangular depressed area bounded by said slit, said clip member having a unitary heel piece and lateral ears integral with the clip and with the heel thereof, for accommodating a clip carrier and a spring metal clip carrier including a washer at right angles to said clip, overlapped at a part of its periphery by said heel piece, said carrier including a shank clasped by said lateral ears and having a triangular extremity extending through said slit and exposed to view within said triangular depression.

10. A clip attachment unit for a fountain pen cap or the like comprising a spring metal washer having a shank at right angles to said washer, the root of said shank being in the plane of said washer, and a clip proper superposed over said shank having a heel piece unitary therewith superposed over the root of said shank and overlapping a part of said washer, said clip having lateral ears straddling said shank near the root thereof, said ears having inturned lugs overlapping the lateral edges of said shank.

11. A clip attachment for a fountain pen cap or the like comprising a clip carrier including a shank, said shank being longitudinally curved near its upper end, a clip proper interlocked with said carrier, said clip including lateral ears having inturned lugs engaging the edges of the curved portion of said carrier and tending to flatten said carrier.

12. A clip attachment unit for a fountain pen cap or the like comprising a spring metal carrier including a washer having a shank at right angles thereto, said shank having its root substantially in the plane of said washer, the upper part of said shank being longitudinally curved, a clip member on said carrier, said clip member having a heel piece overlapping the root of said shank and having lateral ears unitary with the clip and the heel piece thereof and engaging the sides of said carrier shank, said ears having lugs pressed inward therefrom for resilient engagement by the upturned edges of the longitudinally curved shank portion.

BENJAMIN W. HANLE.